United States Patent
Tsuruta et al.

(10) Patent No.: US 7,022,152 B2
(45) Date of Patent: Apr. 4, 2006

(54) AIR CLEANER DEVICE FOR VEHICLE

(75) Inventors: Yuuichirou Tsuruta, Wako (JP); Ken Oike, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 233 days.

(21) Appl. No.: 10/667,560

(22) Filed: Sep. 22, 2003

(65) Prior Publication Data

US 2004/0128963 A1    Jul. 8, 2004

(30) Foreign Application Priority Data

Sep. 30, 2002    (JP) ............................. 2002-287917

(51) Int. Cl.
*B01D 46/00* (2006.01)
*B01D 50/00* (2006.01)

(52) U.S. Cl. .................... 55/385.3; 55/419; 55/482; 55/484; 55/DIG. 28; 96/380; 96/386; 123/198 E; 180/68.3

(58) Field of Classification Search ................ 55/419, 55/385.3, 482, 484, DIG. 28; 180/68.1, 180/68.3; 123/198 E; 96/380, 383, 386
See application file for complete search history.

(56) References Cited

U.S. PATENT DOCUMENTS

| | | | | |
|---|---|---|---|---|
| 2,708,920 A | * | 5/1955 | Pasturczak | 123/198 E |
| 3,987,862 A | * | 10/1976 | Lidstone | 55/385.3 |
| 4,013,137 A | * | 3/1977 | Petersen | 180/68.3 |
| 4,071,009 A | * | 1/1978 | Kraina | 123/198 E |
| 4,484,651 A | * | 11/1984 | Hattori et al. | 55/385.3 |
| 4,681,178 A | * | 7/1987 | Brown | 180/68.3 |
| 4,689,060 A | * | 8/1987 | Koske | 55/385.3 |
| 4,932,490 A | * | 6/1990 | Dewey | 180/68.3 |
| 5,086,858 A | * | 2/1992 | Mizuta et al. | 180/68.3 |
| 5,174,258 A | * | 12/1992 | Tanaka | 123/198 E |
| 5,472,463 A | * | 12/1995 | Herman et al. | 123/198 E |
| 6,325,169 B1 | * | 12/2001 | Tateshima et al. | 55/385.3 |
| 6,409,783 B1 | * | 6/2002 | Miyajima et al. | 55/385.3 |
| 6,537,338 B1 | * | 3/2003 | Inoue et al. | 55/385.3 |
| 6,565,620 B1 | * | 5/2003 | Greeson | 55/385.3 |
| 6,572,667 B1 | * | 6/2003 | Greif et al. | 55/385.3 |
| 6,910,546 B1 | * | 6/2005 | Tsutsumi et al. | 55/385.3 |
| 2005/0051375 A1 | * | 3/2005 | Momosaki | 55/385.3 |

FOREIGN PATENT DOCUMENTS

| JP | 2628641 | | 4/1997 |
|---|---|---|---|
| JP | 2003-65032 | * | 3/2003 |

* cited by examiner

*Primary Examiner*—Jason M. Greene
(74) *Attorney, Agent, or Firm*—Hamre, Schumann, Mueller & Larson, P.C.

(57) ABSTRACT

An air cleaner device 41 which includes a main air cleaner 56 and a sub air cleaner 67 which is connected to the main air cleaner 56, and the sub air cleaner 67 is arranged parallel to the main air cleaner 56 in the longitudinal direction of main frames 55. In this arrangement, the air cleaner device does not projected sideward from a vehicle body and hence, the interference of the air cleaner device with an occupant and lowering of aesthetic appearance of a vehicle can be prevented. Further, since there is no restriction imposed by the interference of the air cleaner device with an occupant and lowering of aesthetic appearance of the vehicle, a capacity of air cleaner device can be easily ensured.

11 Claims, 6 Drawing Sheets

AIR CLEANER DEVICE FOR VEHICLE

TECHNICAL FIELD

The present invention relates to an air cleaner device for a vehicle. More particularly, the present invention relates to an air cleaner device which is capable of preventing the interference of the air cleaner device with an occupant and lowering of aesthetic appearance of the vehicle and is capable of readily ensuring a capacity of the air cleaner device.

BACKGROUND

An air cleaner device for a vehicle, such as that disclosed in Japanese Accepted Patent Publication 2628641 (page 2, FIG. 3), is provided with a main air cleaner and a sub air cleaner.

For example, FIG. 6 of the present application is a plan view of a conventional air cleaner for a vehicle. The drawing shows an air cleaner device in which a sub air cleaner 203 is mounted on a carburetor 201 by way of an outlet tube 202 and a main air cleaner 205 is connected to the sub air cleaner 203 in the vehicle width direction using a connecting tube 204.

In the technique described in Japanese Accepted Patent Publication 2628641, the sub air cleaner 203 and the main air cleaner 205 are arranged in parallel in the vehicle-width direction of the vehicle and hence, for example, the sub air cleaner 203 and the main air cleaner 205 easily interfere with an occupant or are projected outwards, thus deteriorating the aesthetic appearance. In view of the above, it maybe desirable to reduce a projection amount of the air cleaner in the vehicle-width direction to prevent the interference of these cleaners with an occupant and to improve the aesthetic appearance. In this case, however, it is difficult to ensure capacities of the sub air cleaner 203 and the main air cleaner 205 and hence, particularly, with respect to a vehicle having an engine with a large stroke volume, it is difficult to achieve sufficient enhancement of output and the effective reduction of intake noises.

SUMMARY

Accordingly, it is an object of the present invention to prevent the interference of an air cleaner device for a vehicle with an occupant and lowering of aesthetic appearance of a vehicle, and to readily ensure a capacity of the air cleaner device by improving the air cleaner device for a vehicle.

To achieve the above-mentioned object, in accordance with one aspect, an air cleaner device is provided for a vehicle in which an engine is mounted on a pair of left and right vehicle body frames and a carburetor which is mounted on the engine is provided with the air cleaner device, the air cleaner device includes a main air cleaner and a sub air cleaner which is connected to the main air cleaner, and the sub air cleaner is arranged parallel to the main air cleaner in the longitudinal direction of the vehicle body frame.

Compared to a conventional case in which a main air cleaner and a sub air cleaner are arranged in parallel in the vehicle width direction, in the present invention, the air cleaner device is not projected sideward from a vehicle body and hence, the interference of the air cleaner device with an occupant and lowering of aesthetic appearance of the vehicle can be prevented. Further, since there is no restriction imposed by the interference of the air cleaner device with an occupant and lowering of aesthetic appearance of the vehicle, a capacity of the air cleaner device can be easily ensured.

According to another aspect, the sub air cleaner can be arranged outside a vehicle body frame in the vehicle width direction.

Although an engine and a large number of other parts are arranged between left and right vehicle body frames, a relatively large space for arranging the sub air cleaner can be provided outside the vehicle body frame in the vehicle width direction and hence, the degree of freedom in the arrangement of the sub air cleaner can be enhanced, whereby the capacity of the sub air cleaner can be easily ensured.

In accordance with yet another aspect, an intake port, which takes outside air into the air cleaner device, is formed in the main air cleaner and a connecting port between the sub air cleaner and the main air cleaner is made to face the intake port in an opposed manner.

By adopting the sub air cleaner as a chamber having an intake noise reduction effect, intake noises which are generated by air taken into the sub air cleaner from the intake port of the main air cleaner can be more effectively reduced by making the connecting port face the intake port in an opposed manner.

The above summary is not intended to describe each disclosed embodiment or every implementation of the present invention. Figures and the detailed description that follow more particularly exemplify embodiments of the invention. While certain embodiments will be illustrated and described, the invention is not limited to use in such embodiments.

BRIEF DESCRIPTION OF THE DRAWINGS

Aspects of the invention may be more completely understood in consideration of the following detailed description of various embodiments of the invention in connection with the accompanying drawings.

While the invention is amenable to various modifications and alternative forms, specifics thereof have been shown by way of example and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Figure 1:
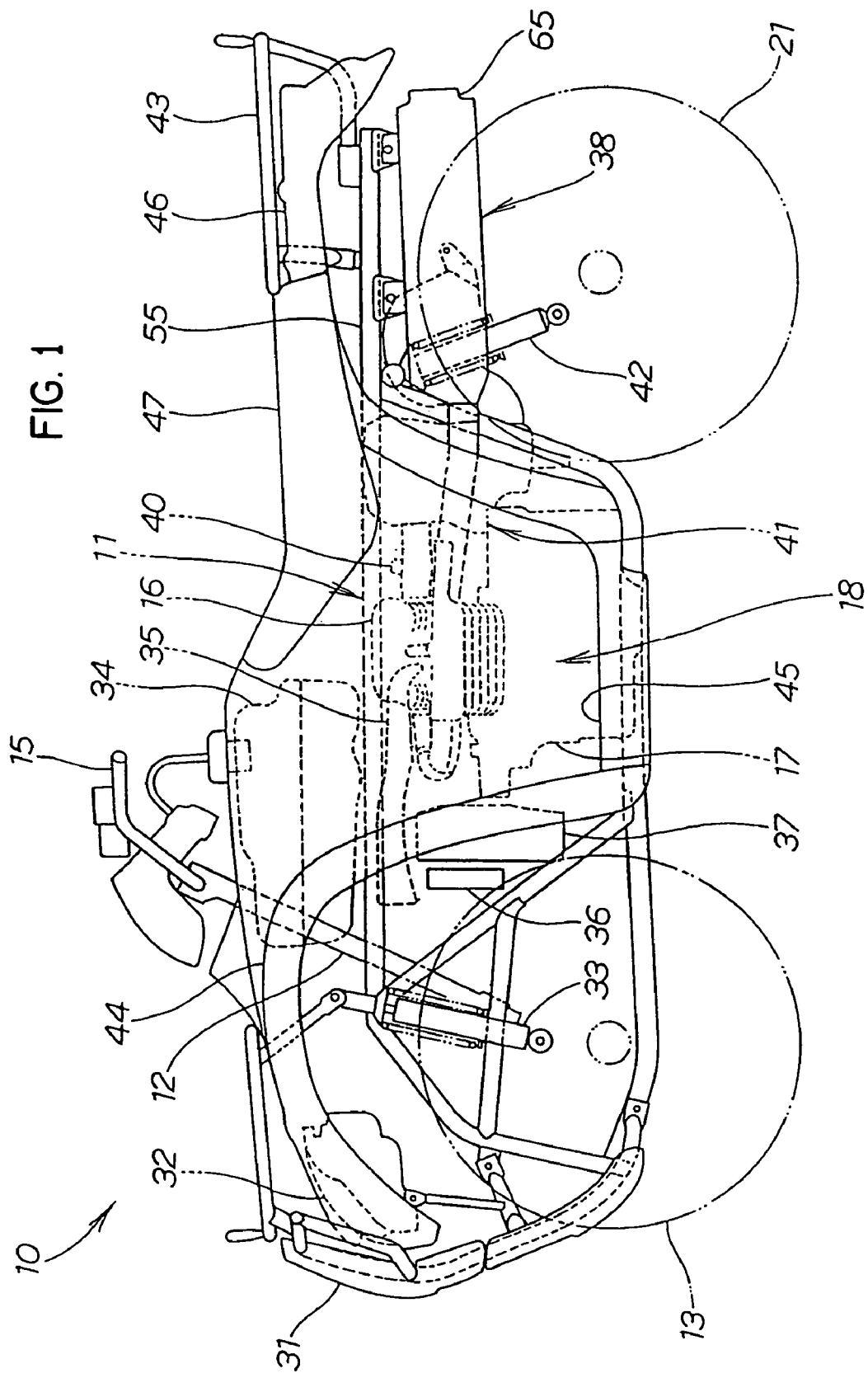
FIG. 1 is a side view of a vehicle provided with an air cleaner device according to the present invention.

FIG. 1 is a side view of an example vehicle provided with an example air cleaner device according to the present invention. A vehicle 10 is preferably a vehicle for off-road traveling in which a handle post 12 is mounted on a front portion of a vehicle body frame 11, the handle post 12 having a lower end portion side thereof connected to left and right front wheels 13, 14 (only the front wheel 13 is visible in FIG. 1), a handle 15 is mounted on an upper end portion side of the handle post 12. A power unit 18 including an engine 16 and a transmission 17 is mounted on an intermediate portion of the vehicle body frame 11, and left and right rear wheels 21, 22 (only the rear wheel 21 is visible in FIG. 1) which are driven together with the front wheels 13, 14 by the power unit 18 are arranged at a rear portion side of the vehicle body frame 11.

Here, numeral 31 indicates a front guard which protects a front face of the vehicle body, numerals 32, 32 indicate head lamps (only one guard 32 closer to a viewer of the drawing is shown in FIG. 1), numerals 33, 33 indicate shock absorbers (only one shock absorber 33 closer to a view of the drawing is shown in FIG. 1) for the front wheels 13, 14, numeral 34 indicates a fuel tank mounted on the vehicle body frame 11, numeral 35 indicates an air duct for supplying air to a high-temperature portion of the engine 16, numeral 36 indicates an oil cooler, numeral 37 indicates a shroud which surrounds a fan for the oil cooler 36, numeral 38 indicates an exhaust device which is connected to a front portion of the engine 16 and, at the same time, is bent and extended rearward. Numeral 40 indicates a carburetor which is connected to a rear portion of the engine 16, numeral 41 indicates the air cleaner device of the present invention which is connected to a rear portion of the carburetor 40, numerals 42, 42 indicate shock absorbers (only one shock absorber 42 close to a viewer of the drawing is shown in FIG. 1) for the rear wheels 21, 22, numeral 43 indicates a rear carrier on which a load is carried, numerals 44, 44 indicate front fenders which cover upper and rear portions of the front wheels 13, 14, numerals 45, 45 indicate steps on which a driver places his feet, numerals 46, 46 indicate rear fenders which cover front and upper portions of the rear wheels 21, 22, and numeral 47 indicates a seat. (Note that only one front fender 44, step 45, and rear fender 46 are visible in FIG. 1.)

Figure 2:
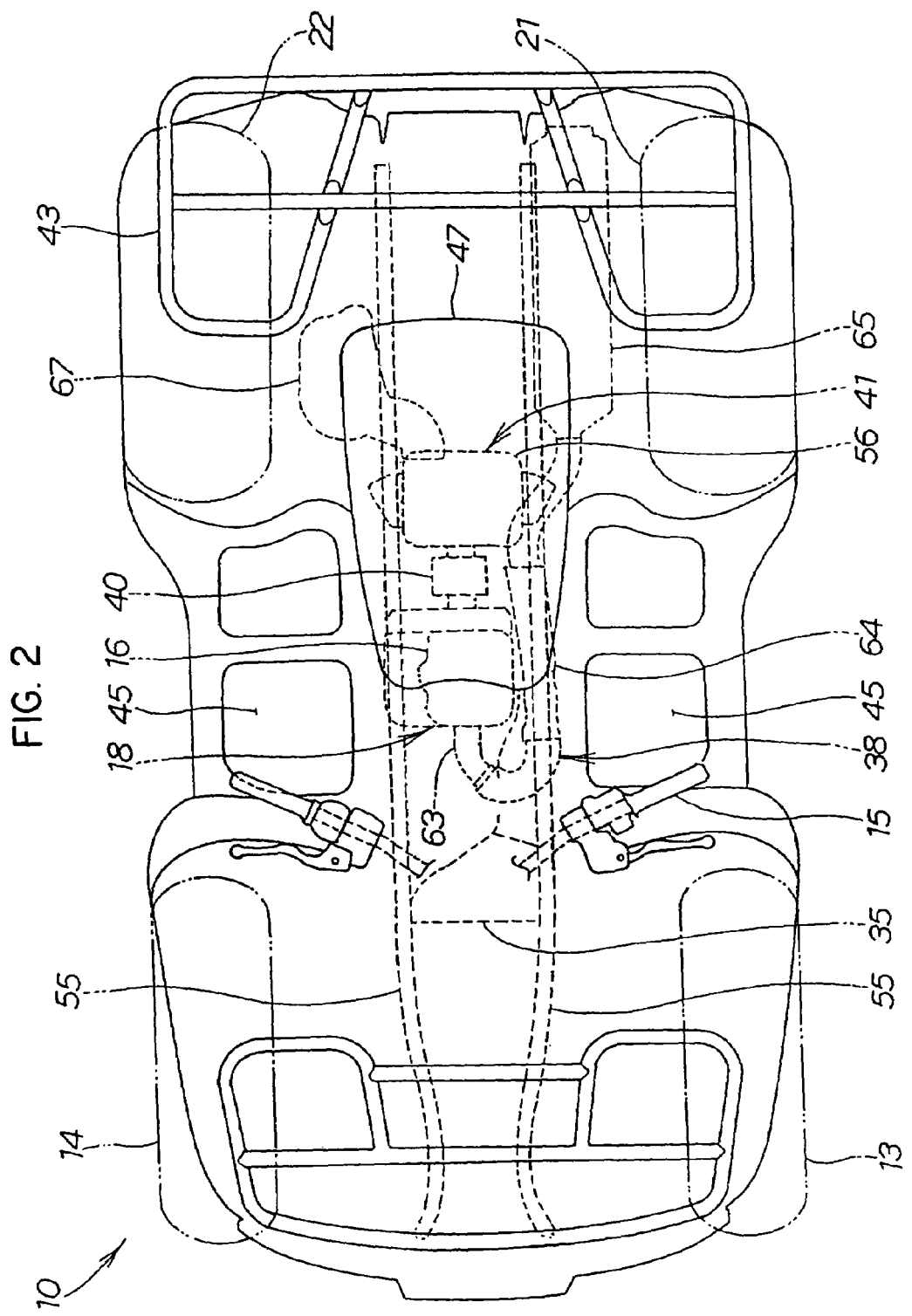
FIG. 2 is a plan view according to the present invention.

FIG. 2 is a plan view of the vehicle according to the present invention. In the drawing, left and right main frames 55, 55 which constitute portions of the vehicle body frame 11 are arranged to extend at a center portion of the vehicle body and in the fore and aft directions. The power unit 18, the air duct 35 for cooling engine and a main air cleaner 56 which constitutes the air cleaner device 41 are arranged between these main frames 55, 55. A front end portion of the air duct 35 has a width substantially equal to a width between main frames 55, 55. The exhaust device 38 extending from the engine 16 is bent in a U shape and is extended rearward.

The exhaust device 38 includes a U-shaped exhaust pipe 63 bent in a U shape, an intermediate exhaust pipe 64 which is connected to a rear portion of the U-shaped exhaust pipe 63, and a silencer 65 which is connected to a rear portion of the intermediate exhaust pipe 64. As shown in FIG. 1, the silencer 65 is mounted on a rear portion of one main frame 55.

The air cleaner device 41 includes the above-mentioned main air cleaner 56 which is connected to the carburetor 40 and a sub air cleaner 67 which is connected to a rear portion of the main air cleaner 56. The main air cleaner 56 and the sub air cleaner 67 are arranged in parallel in the fore and aft directions of the vehicle body and, at the same time, the sub air cleaner 67 is arranged outside one main frame 55 and inside the rear wheel 22. The main air cleaner 56 is mounted on the main frames 55, 55, while a rear portion of the sub air cleaner 67 is mounted on one main frame 55.

Figure 3:
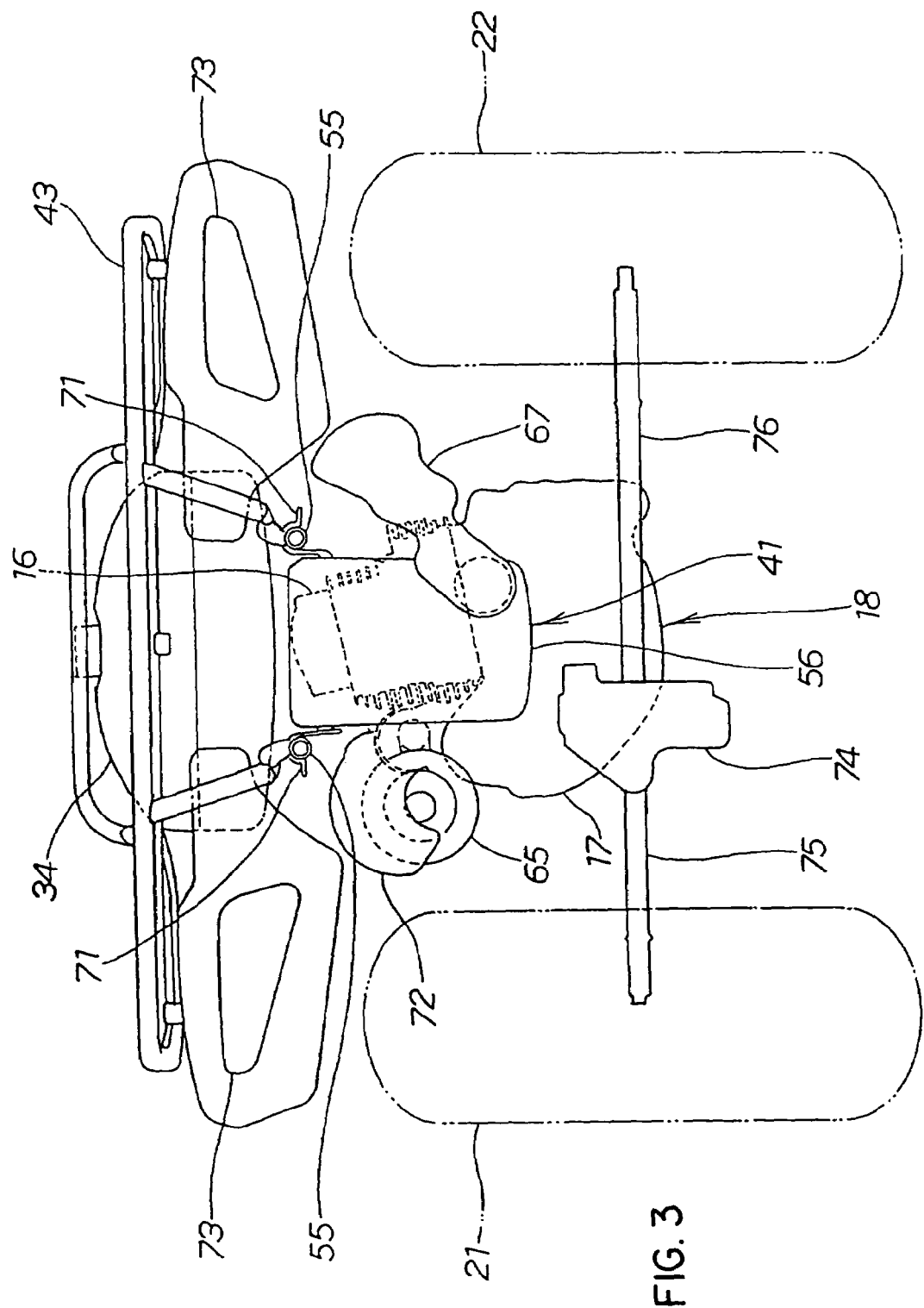
FIG. 3 is a back view according to the present invention.

FIG. 3 is a back view of the vehicle according to the present invention. In the drawing, left and right upper portions of the main air cleaner 56 of the air cleaner device 41 are respectively mounted on the main frames 55, 55 using mounting brackets 71, 71, while the sub air cleaner 67 which is connected to the rear portion of the main air cleaner 56 is arranged in a space defined inside the rear wheel 22. Here, numeral 72 indicates a heat shielding plate which covers an upper portion and side portions of the silencer 65, numerals 73, 73 indicate tail lamps, numeral 74 indicates a final reduction gear for transmitting power to the rear wheels 21, 22, and 75, 76 are axles which are extended toward the left and right rear wheels 21, 22 sides from the final reduction gear 74 to transmit the power to the rear wheels 21, 22.

Figure 4:
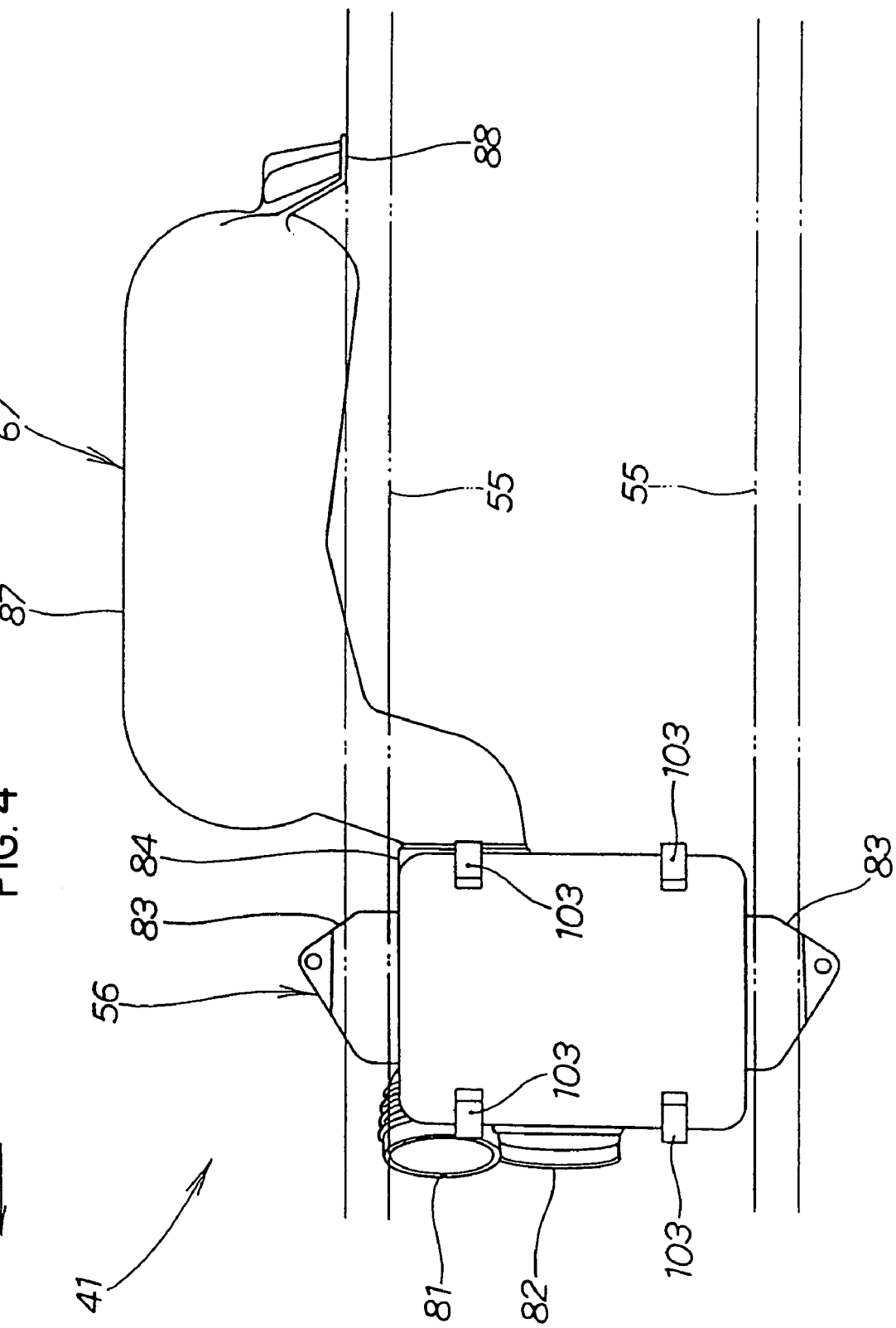
FIG. 4 is a plan view of the air cleaner device according to the present invention.

FIG. 4 is a plan view of the air cleaner device according to the present invention, wherein the sub air cleaner 67 is connected to the rear portion of the main air cleaner 56. Here, an arrow (labeled "front") in the drawing shows a front side of the vehicle body (referred in the same manner hereinafter).

The main air cleaner 56 is a vessel having a rectangular shape in a plan view and is provided with an air filter element (not shown in the drawing) for removing dust in an intake air in the inside thereof. The main air cleaner 56 is provided with an intake port 81 for taking outside air therein and a carburetor connecting member 82 for connecting the main air cleaner 56 to the carburetor 40 (see FIG. 2) on a front surface thereof, is provided with vehicle-body-side mounting portions 83, 83 for mounting the main air cleaner 56 to brackets at the main frames 55, 55 side on both side surfaces thereof, and is further provided with a connecting member 84 for connecting the main air cleaner 56 to the sub air cleaner 67 on a rear surface thereof.

The sub air cleaner 67 is constituted of a connecting pipe portion 86 which is connected to the rear portion of the main air cleaner 56 by way of the connecting member 84 and is extended in the rearward and in the oblique sideward direction of the vehicle body and a resonance chamber 87 which is integrally formed with the connecting pipe portion 86 at a rear portion of the connecting pipe portion 86 in the fore and aft directions of the vehicle body. The sub air cleaner 67 decreases intake noises by making use of a resonance action. The sub air cleaner 67 is further provided with a vehicle-body-side mounting portion 88 for mounting the sub air cleaner 67 to a side surface of one main frame 55 at a rear portion thereof.

Figure 5:
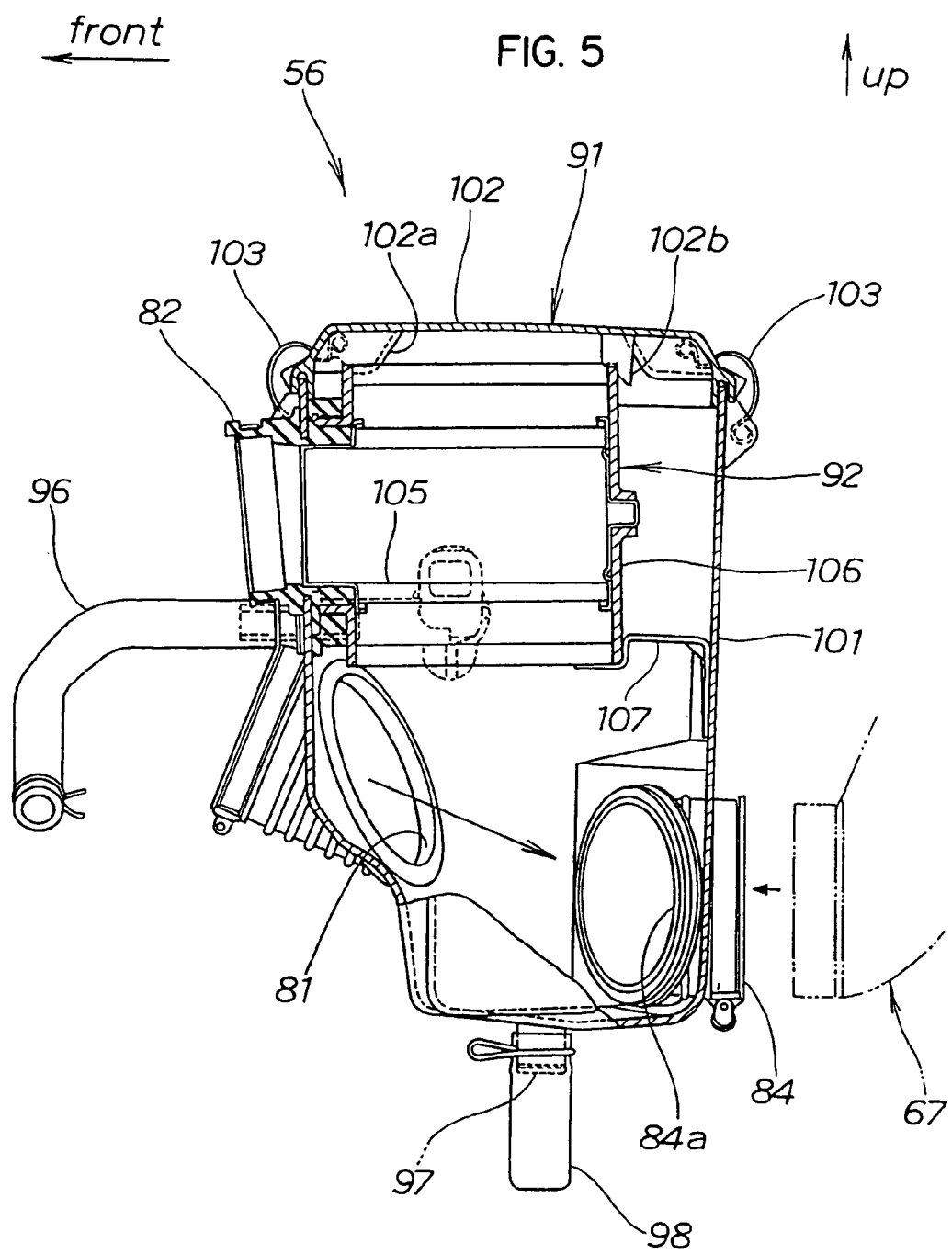
FIG. 5 is a cross-sectional view of a main air cleaner according to the present invention.
Figure 6:
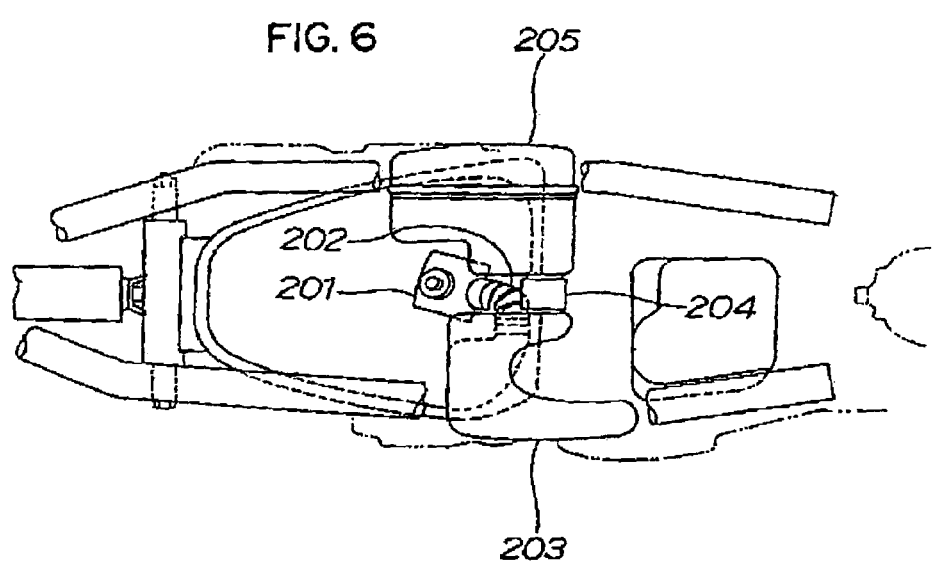
FIG. 6 is a plan view of a conventional air cleaner device for a vehicle.

FIG. 5 is a cross-sectional view (a side view in part and an arrow (labeled "up") indicating an upward direction) of the main air cleaner according to the present invention. The main air cleaner 56 includes an air cleaner casing 91, an air cleaner element 92 which is housed in the inside of the air cleaner casing 91, the carburetor connecting member 82 and the connecting member 84. Here, numeral 96 indicates a breathing hose for introducing an oil mist in the inside of a crankcase of the engine 16 (see FIG. 1) to the inside of the main air cleaner 56, numeral 97 indicates a drain portion for discharging oil or water staying inside the main air cleaner 56, and numeral 98 indicates a rubber cap which seals the drain portion 97.

The carburetor connecting member 82 is preferably made of rubber and is fitted into a hole formed in the air cleaner casing 91.

The carburetor connecting member 84 is preferably made of rubber and is fitted into a hole formed in the air cleaner casing 91. By setting the position of the connecting member 84 below the sub air cleaner 67, it is possible to facilitate the flow of water in the inside of the sub air cleaner 67 to the drain portion 97 of the main air cleaner 56.

Further, an opening 84a of the connecting member 84 is a part which substantially faces the intake port 81 in an opposed manner and hence, intake noises which are generated due to air taken into the air cleaning device from the intake port 81 in an arrow direction can be effectively reduced.

The air cleaner case 91 includes an air cleaner body 101 on which the above-mentioned carburetor connecting member 82 and connecting member 84 are mounted and an air cleaner cover 102 which seals an upper opening of the air cleaner body 101. The air cleaner cover 102 is replaceably mounted on the air cleaner body 101 using retainers 103 each made of a C-shaped leaf spring, thus allowing maintenance of the air cleanser element 92.

The air cleaner element 92 includes a filter paper 105 and a frame body 106 which supports the filter paper 105. This air cleaner element 92 is held by the carburetor connecting member 82, a holder 107 mounted on the air cleaner body 101, and projecting portions 102a, 102b which are formed on the air cleaner cover 102.

Embodiments of the present invention disclosed herein can exhibit one or more of the following advantageous effects.

For example, the air cleaner device can include the main air cleaner and the sub air cleaner which is connected to the main air cleaner, and the sub air cleaner can be arranged parallel to the main air cleaner in the longitudinal direction of the vehicle body frame. Accordingly, compared to a conventional systems in which a main air cleaner and a sub air cleaner are arranged in parallel in the vehicle width direction, in the present invention, the air cleaner device preferably does not projected sideward from the vehicle body and hence, the interference of the air cleaner device with the occupant and lowering of aesthetic appearance of the vehicle can be prevented. Further, since there is no restriction imposed by the interference of the air cleaner device with the occupant and lowering of aesthetic appearance of the vehicle, the capacity of the air cleaner device can be easily ensured.

In addition, the sub air cleaner can be arranged at the outside of the vehicle body frame in the vehicle width direction and hence, it is easy to ensure the relatively large space for arranging the sub air cleaner whereby the degree of freedom in the arrangement of the sub air cleaner can be enhanced whereby the capacitance of the sub air cleaner can be easily ensured.

Further, the intake port which takes outside air into the air cleaner device can be formed in the main air cleaner and the connecting port between the sub air cleaner and the main air cleaner can be made to face the intake port in an opposed manner. By adopting the sub air cleaner as the chamber having the intake noise reduction effect, the intake noise which is generated by air taken into the sub air cleaner from the intake port of the main air cleaner can be more effectively reduced by making the connecting port face the intake port in an opposed manner.

The above specification, examples and data provide a complete description of the manufacture and use of various aspects of the invention. Many alternative embodiments of the invention can be made without departing from the spirit and scope of the invention.

What is claimed is:

1. An air cleaner device for a vehicle in which an engine is mounted on a vehicle body frame, wherein the air cleaner device includes a main air cleaner and a sub air cleaner which is coupled to the main air cleaner, and wherein the sub air cleaner is arranged parallel to the main air cleaner in a longitudinal direction of the vehicle body frame, wherein an intake port which takes air into the air cleaner device is formed in the main air cleaner and a connecting port between the sub air cleaner and the main air cleaner faces the intake port in an opposed manner.

2. The air cleaner device of claim 1, wherein the sub air cleaner is arranged outside the vehicle body frame in the longitudinal direction.

3. The air cleaner device of claim 1, wherein the sub air cleaner is arranged outside the vehicle body frame and inside rear wheels of the vehicle.

4. The air cleaner device of claim 1, wherein the main air cleaner is mounted on the vehicle body frame, and a rear portion of the sub air cleaner is mounted on the vehicle body frame.

5. An off-road vehicle, comprising:
a vehicle body frame;
an engine mounted to the frame;
a main air cleaner; and
a sub air cleaner that is coupled to the main air cleaner, wherein the sub air cleaner is arranged parallel to the main air cleaner in a longitudinal direction of the vehicle body frame, and wherein the sub air cleaner is arranged outside the vehicle body frame in the longitudinal direction,
wherein an intake port which takes air into the air cleaner device is formed in the main air cleaner and a connecting port between the sub air cleaner and the main air cleaner faces the intake port in an opposed manner.

6. The vehicle of claim 5, wherein the sub air cleaner is arranged outside the vehicle body frame and inside rear wheels of the vehicle.

7. The vehicle of claim 5, wherein the main air cleaner is mounted on the vehicle body frame and a rear portion of the sub air cleaner is mounted on the vehicle body frame.

8. An air cleaner device for a vehicle in which an engine is mounted on a vehicle body frame, wherein the air cleaner device includes a main air cleaner and a sub air cleaner which is connected to the main air cleaner, and means for arranging the sub air cleaner in parallel with the main air cleaner in a longitudinal direction of the vehicle body frame, wherein an intake port which takes air into the air cleaner device is formed in the main air cleaner and a connecting port between the sub air cleaner and the main air cleaner faces the intake port in an opposed manner.

9. The air cleaner device of claim 8, wherein the sub air cleaner is arranged outside the vehicle body frame in the longitudinal direction.

10. The air cleaner device of claim 8, wherein the sub air cleaner is arranged outside the vehicle body frame and inside rear wheels of the vehicle.

11. The air cleaner device of claim 8, wherein the main air cleaner is mounted on the vehicle body frame and a rear portion of the sub air cleaner is mounted on the vehicle body frame.

* * * * *